Patented Dec. 13, 1949

2,491,433

UNITED STATES PATENT OFFICE 2,491,433

INTERPOLYMERS OF BUTADIENE, ACRYLONITRILE, AND A HEXADIENE

William D. Wolfe, Cuyahoga Falls, Ohio, assignor to Wingfoot Corporation, Akron, Ohio, a corporation of Delaware No Drawing. Application November 30, 1946, Serial No. 713,379

3 Claims. (Cl. 260—80.7)

This invention relates to a new synthetic rubber composition having desirable properties. More particularly, the invention relates to conventional synthetic rubbers, such as butadiene-acrylonitrile and butadiene-styrene copolymers, which are modified by copolymerization in the presence of a minor proportion of a mixture of hexadienes prepared from diacetone alcohol by hydrogenation to form 2-methyl-2,4-pentanediol, which is subsequently dehydrated to form a mixture of hexadienes. The hexadiene mixture contains two isomeric methyl-pentadienes, 2-methyl-pentadiene-1,3 and 4-methyl-pentadiene-1,3. Further details of the preparation of the hexadiene mixture will be found in the Journal of the Chemical Society, 1931, at page 3233. Throughout this specification and the appended claims the mixture of the methyl pentadienes will be referred to as "a mixture of hexadienes prepared by the dehydration of 2-methyl-2,4-pentanediol."

The purpose of this invention is to provide a softer rubber than can be obtained by poylmerization of butadiene-1,3 and either acrylonitrile or styrene by conventional practice. A further purpose of the invention is to utilize a readily available supply of polymerizable monomer in the preparation of a useful and valuable product.

It has been found that if commercial rubbers, which are copolymers of from 40 to 80 percent of butadiene-1,3 and from 60 to 20 percent of either acrylonitrile or styrene, are prepared in the presence of up to 16 percent (by weight of the other polymerizable monomers) of a mixture of the hexadienes, and preferably one to 16 percent, a very desirable modification of the usual physical properties of the synthetic rubber will be achieved. The addition of the hexadiene mixture to the polymerization mass tends to soften the resulting synthetic rubber.

The preferred method of effecting the polymerization of the methyl pentadiene mixtures in the presence of butadiene-1,3 involves the use of conventional aqueous emulsion polymerization techniques. The mixtures of polymerizable monomers are charged to a closed retort provided with a stirring device or other means for maintaining the reactants dispersed in the water. Oxidizing catalysts, such as sodium perborate, hydrogen peroxide, and sodium persulfate are usually added, as well as emulsion stabilizing substances, such as sodium lauryl sulfate, triethanol amine, sodium stearate, and salts of the rosin acids. Frequently it is desirable to control the pH value of the reaction mass by means of buffer solutions, such as MacIlvaine's buffer, which is a mixture of citric acid and disodium phosphate in proportions adapted to give the desired hydrogen ion concentration. A small proportion of carbon tetrachloride may be added to further catalyze the polymerization.

Further details of the practice of this invention are set forth with respect to the following example.

A series of 18 polymerization vessels were each charged with the following:

10 cc. of 5 percent aqueous sodium lauryl sulfate
10 cc. MacIlvaine's buffer (pH=7)
0.133 g. sodium perborate
0.48 g. carbon tetrachloride In addition each of the following monomer proportions was charged into six of the vessels; three series thus being established:

(A) 12 g. butadiene and 4 g. acrylonitrile
(B) 9.6 g. butadiene and 6.4 g. acrylonitrile
(C) 8.0 g. butadiene and 8.0 g. acrylonitrile Five vessels of each of these series were respectively charged with each of 1, 4, 8, 12 and 16 percent by weight of the combined butadiene and acrylonitrile, of the mixture of hexadienes prepared by the dehydration of 2-methyl-2,4-pentane-diol. One vessel of each of the butadiene-acrylonitrile formulations was used as a control.

The eighteen vessels were agitated by shaking at a temperature of 38° C. for eight days. The rubbers were coagulated by ethyl alcohol. The copolymers of monomer mixtures including the hexadienes were in all cases softer and more workable than were the controls.

This application is a continuation-in-part of application Serial No. 454,573 filed August 12, 1942, now abandoned.

Although the invention has been described with respect to specific embodiments thereof, it is not intended that the details therein shall be construed to be limitations upon the scope of the invention except to the extent incorporated in the following claims.

I claim:

1. A copolymer of from 40 to 80 percent of butadiene, from 60 to 20 percent of acrylonitrile and from 2 to 16 percent, by weight of the combined butadiene and acrylonitrile, of a hexadiene mixture prepared by the dehydration of 2-methyl-2,4-pentane-diol.

2. A copolymer of 60% of butadiene, 40% of acrylonitrile, and from 2 to 16%, based on the combined weights of the other monomers, of a hexadiene mixture prepared by the dehydration of 2-methyl-2,4-pentanediol.

3. A copolymer of 50% of butadiene, 50% of acrylonitrile, and from 2 to 16%, based on the combined weights of the other monomers, of a hexadiene mixture prepared by the dehydration of 2-methyl-2,4-pentanediol.

WILLIAM D. WOLFE.

REFERENCES CITED

The following references are of record in the file of this patent:

UNITED STATES PATENTS

| Number | Name | Date |
| --- | --- | --- |
| 2,391,817 | Blackburn | Dec. 25, 1945 |